(12) United States Patent
Aker

(10) Patent No.: US 6,591,954 B2
(45) Date of Patent: Jul. 15, 2003

(54) CLUTCH BRAKE

(75) Inventor: Michael D. Aker, Auburn, IN (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/966,621

(22) Filed: Sep. 28, 2001

(65) Prior Publication Data

US 2003/0062234 A1 Apr. 3, 2003

(51) Int. Cl.$^7$ .......................... F16D 13/22; F16D 13/38
(52) U.S. Cl. .................. 192/13 R; 192/70.13; 192/52.6; 192/70.28; 192/107 C
(58) Field of Search .................. 192/13 R, 70.13, 192/52.6, 70.28, 107 C

(56) References Cited

U.S. PATENT DOCUMENTS

| | | | |
|---|---|---|---|
| 3,108,658 A | * | 10/1963 | Bassett ..................... 192/13 R |
| 3,179,217 A | | 4/1965 | Root |
| 3,763,977 A | | 10/1973 | Sink |
| 3,942,617 A | | 3/1976 | Poon |
| 4,108,295 A | | 8/1978 | De Gennes |
| 4,223,764 A | * | 9/1980 | Flotow ..................... 188/72.3 |
| 4,512,450 A | | 4/1985 | Babcock |
| 4,657,124 A | | 4/1987 | Flotow |
| 4,662,483 A | * | 5/1987 | Boeck ..................... 188/72.7 |
| 4,762,215 A | | 8/1988 | Flotow et al. |
| 4,919,243 A | | 4/1990 | Flotow |
| 4,947,969 A | | 8/1990 | Tarlton, Sr. |
| 5,031,739 A | | 7/1991 | Flotow et al. |
| 5,076,406 A | | 12/1991 | Gregory et al. |
| 5,285,881 A | | 2/1994 | Leor et al. |
| 5,415,256 A | | 5/1995 | Weigand et al. |
| 5,435,425 A | | 7/1995 | Ijames |
| 5,713,443 A | | 2/1998 | Kronstadt |
| 5,927,460 A | * | 7/1999 | Ament ..................... 188/72.3 |
| 5,957,256 A | | 9/1999 | Allen, Jr. et al. |

FOREIGN PATENT DOCUMENTS

| | | |
|---|---|---|
| DE | 3211759 A1 | 11/1983 |
| GB | 2 119 879 A | 11/1983 |
| WO | WO 99/067374 | 2/1999 |

* cited by examiner

Primary Examiner—Richard M. Lorence
Assistant Examiner—Eric M. Williams
(74) Attorney, Agent, or Firm—Rader, Fishman & Grauer PLLC

(57) ABSTRACT

A brake is provided that includes a friction disc assembly having two opposing friction discs separated by at least one resilient biasing member. A brake disc is positioned between the friction discs of the friction disc assembly and is splined to rotate with the shaft. A side of each friction disk that faces the brake disc is covered with a friction material. In normal operations, the friction discs are spaced apart from the brake disc. When it is desired to slow the rotation of the shaft, a release member contacts and compresses the friction disc assembly against a housing causing the friction material on each of the friction discs to contact and slow rotation of the brake disc. The present invention is particularly suited for use as a clutch brake for slowing rotation of an input shaft disposed between a clutch and a transmission of a vehicle.

24 Claims, 3 Drawing Sheets

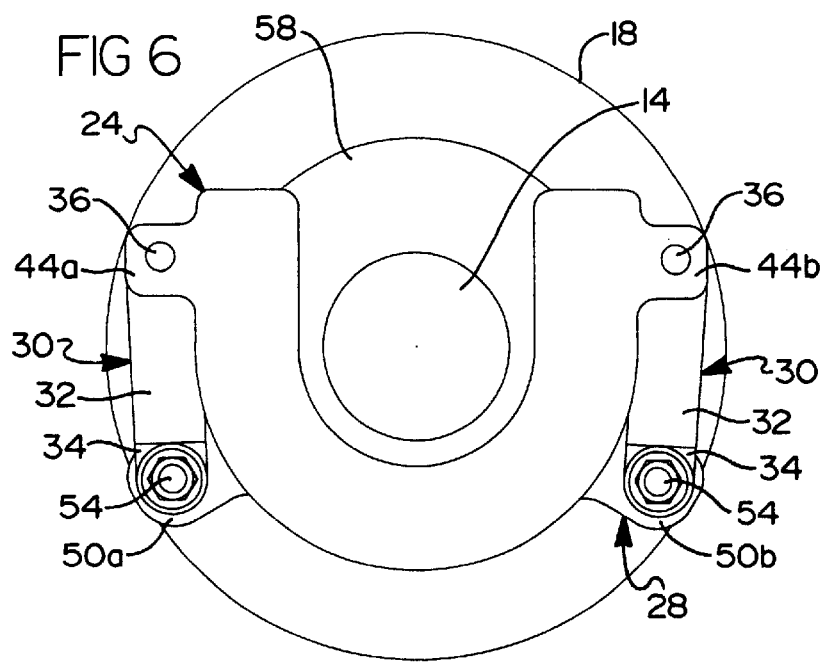
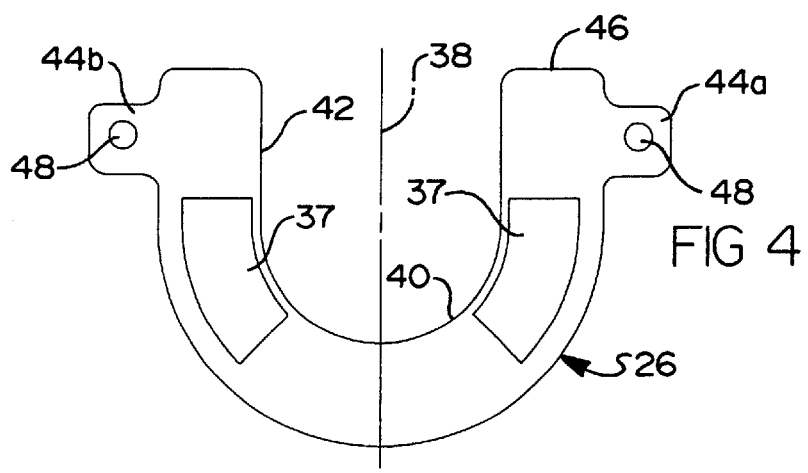
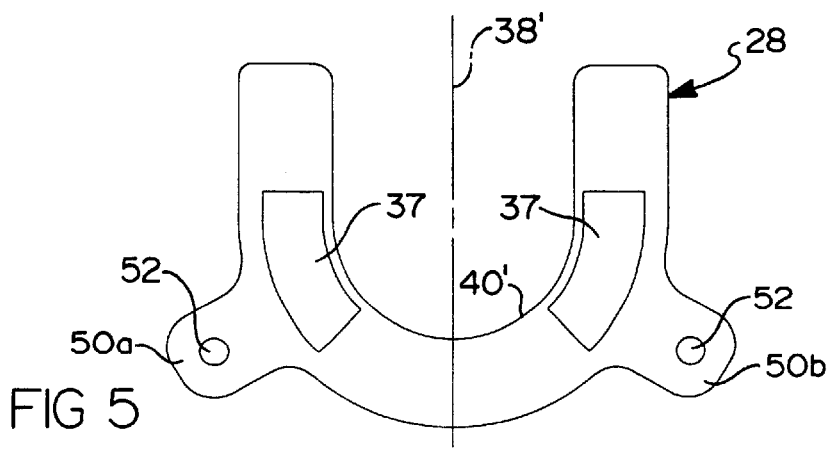

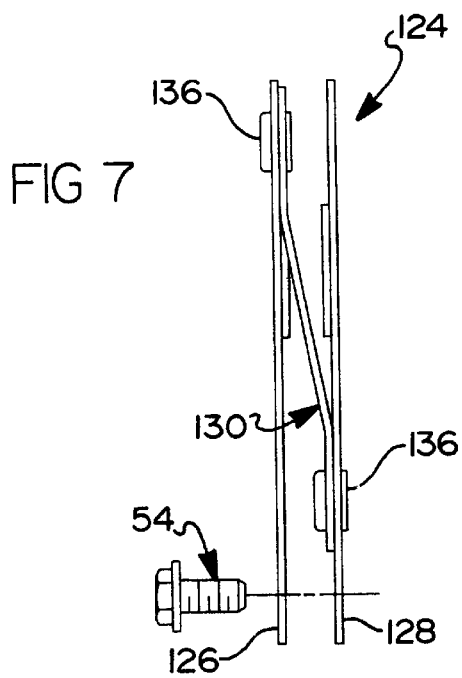
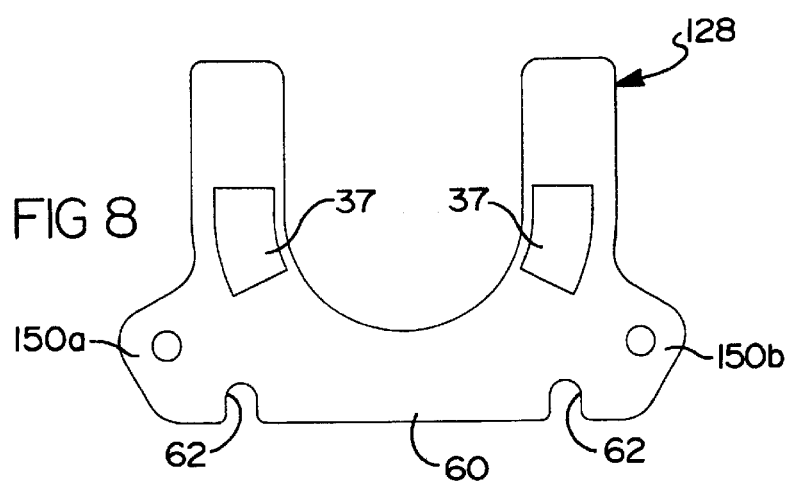
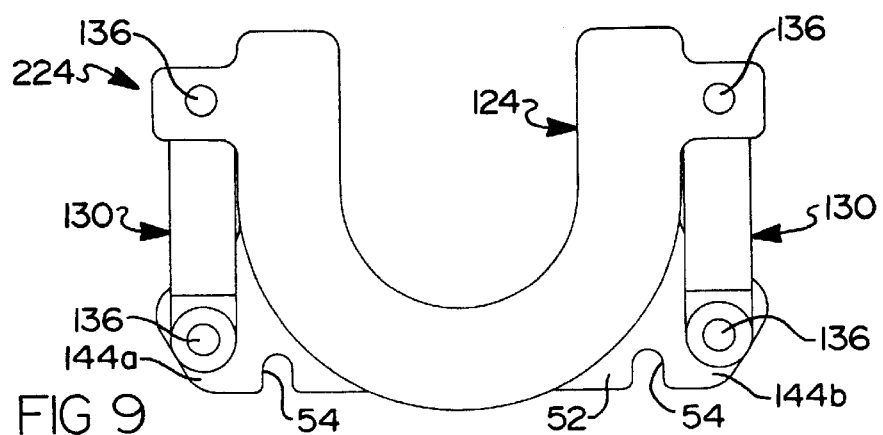

CLUTCH BRAKE

FIELD OF THE INVENTION

The present invention relates to heavy-duty driveline friction clutches of the type used for large vehicles such as trucks, tractor-trailers and the like, and more particularly, to a clutch brake assembly for use in a driveline friction clutch.

BACKGROUND OF THE INVENTION

The use and function of a clutch brake is well known in the art, as discussed, for example by Kronstadt (U.S. Pat. No. 5,713,443), Allen, Jr. et al. (U.S. Pat. No. 5,957,256) and Weigand et al. (U.S. Pat. No. 5,415,256) the disclosures of which are hereby incorporated by reference in their entirety. A clutch brake is a device used to rapidly slow the rotational speed of a transmission input shaft when a driveline master clutch is disengaged to facilitate the shifting of gears in the transmission. Without a clutch brake, the time required to shift a transmission would be significantly increased, thereby complicating the operation of the transmission in several driving modes.

Typically, the clutch brake is a disc-shaped device, a portion of which is splined to the input shaft of the transmission and is activated by a master clutch release mechanism when the master clutch is disengaged. Upon disengagement of the master clutch, friction elements of the clutch brake are pressed between a transmission housing and the release mechanism creating a frictional drag or braking force that slows the spinning transmission input shaft to facilitate gear shifting.

Normally, a release bearing, which is the operating portion of the release mechanism, moves between engaged (near the clutch) and disengaged (nearer the transmission) positions causing the master clutch to selectively connect and disconnect the transmission input shaft from the engine. When the release bearing is moved within a normal shifting range, the clutch brake is not engaged. However, when it is desired to rapidly slow the rotation of the transmission input shaft to facilitate a gear shift, the release mechanism is moved beyond the normal shift range so as to trap and clamp the clutch brake between the release bearing and the transmission housing. When so moved, the rotation of the clutch brake disc and consequently the transmission input shaft is slowed or stopped.

In normal use, the frictional elements of the clutch brake eventually wear out and must be replaced. The process of replacing the clutch brake requires lowering and disconnection of the transmission to remove and replace the clutch brake friction elements. The prior art teaches two-piece discs that allow removal and installation of the clutch brake without partially disassembling the clutch or transmission. However, such clutch brakes have multi-piece structures that still render them laborious to remove and re-install given the limited space present between modern clutches and transmissions.

SUMMARY OF THE INVENTION

The present invention provides an improved structure for a shaft brake that can be easily installed and removed from a shaft. In a preferred embodiment, the brake includes a friction disc assembly comprising two opposing "U" shaped friction discs separated by at least one resilient biasing member. A brake disc is sandwiched between the friction discs of the friction disc assembly and is splined to rotate with a shaft, such as a transmission input shaft. A side of each friction disk that faces the brake disc is covered with a friction material. In normal operations, the friction discs are spaced apart from the brake disc by the biasing member. When it is desired to slow the rotation of the shaft, a release member contacts and compresses the friction disc assembly against a housing causing the friction material on each of the friction discs to contact the brake disc.

In a preferred embodiment, the friction discs include an open section for disposing the friction disk assembly about the shaft. A slot in communication with the open section facilitates installation and removal of the friction disk assembly around the shaft. The friction disk assembly is preferably removably secured to the housing by at least one fastener.

The present invention is particularly suited for use as a clutch brake for slowing rotation of an input shaft disposed between a clutch and a transmission of a vehicle. Among other advantages, the clutch brake of the present invention includes a friction disk assembly that may be easily installed and removed without disassembling the clutch or the transmission. The friction disk assembly advantageously provides a friction disk on each side of a brake disc without requiring that an individual disk be secured to both a master clutch release member and a transmission housing.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 4 is an inwardly facing elevational view of a first friction disc according to a preferred embodiment.

FIG. 5 is an inwardly facing elevational view of a second friction disc according to a preferred embodiment.

FIG. 6 is a forward facing elevational view of the clutch brake according to a preferred embodiment.

FIG. 7 is a side elevational view of a friction disk assembly according to a second embodiment.

FIG. 8 is an inwardly facing elevational view of a second friction disc according a second embodiment.

FIG. 9 is a forward facing elevational view of the friction disk assembly according to a second embodiment.

DESCRIPTION OF THE PREFERRED EMBODIMENT

Figure 1:
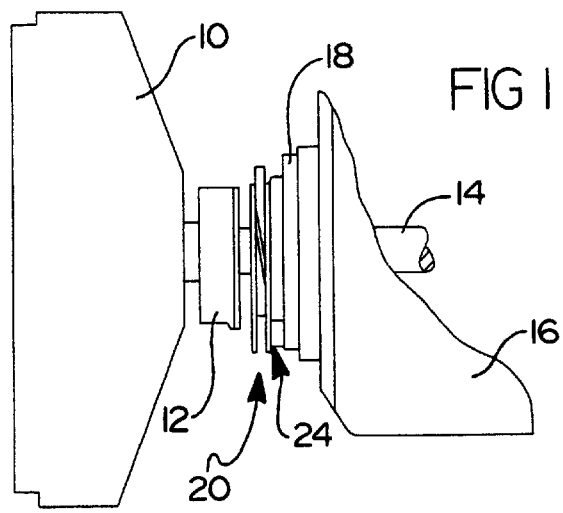
FIG. 1 is a side elevational view of a clutch brake of the present invention installed on a transmission.

Referring now to the drawings, the preferred embodiments of the present invention are described in detail. In this disclosure, certain terminology will be used in the following description for convenience in reference only and will not be limiting. For example, the terms "forward" and "rearward" will refer to directions forward and rearward of the clutch brake as installed on a transmission. The terms "rightward" and "leftward" will refer to directions in the drawings in connection with which the terminology is used. The terms "inwardly" and "outwardly" will refer to directions toward and away from, respectively, the geometric center of the clutch brake of the present invention. All foregoing terms mentioned above include the normal derivatives and equivalents thereof. The term "transmission" and "master clutch" as used herein shall include all types of gear change transmissions including single countershaft and twin countershaft types and all types of master driveline clutches, respectively.

Although the shaft brake according to the present invention may be used in various applications requiring the rotational slowing of a shaft, the present invention is particularly suited for use as a clutch brake for slowing rotation of an input shaft disposed between a clutch and a transmission of a motor vehicle, and will be described in connection therewith.

Referring to FIG. 1 of the drawings, a side elevational view of the clutch brake 20 of the present invention installed on a vehicle driveline transmission 16 is shown. A driveline master clutch assembly 10 is disengaged by a clutch release bearing assembly 12 that rotates on a transmission input shaft 14. Driveline transmission 16 includes a housing front section 18 that provides a grounded surface against which the clutch brake 20 can be pressed by the axial movement of release bearing assembly 12 in a rightward axial direction. Release bearing 12 is moved axially to press against clutch brake 20 when it desired to slow the rotation of transmission input shaft 14, thereby facilitating the shifting of transmission 16 from one gear to another gear.

Figure 3:
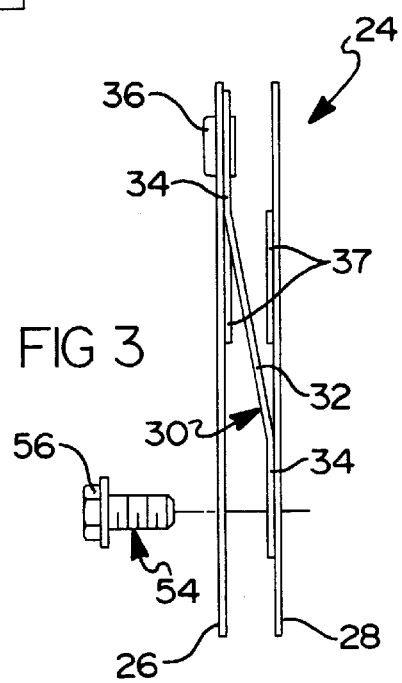
FIG. 3 is a side elevational view of a friction disk assembly according to a preferred embodiment.
Figure 2:
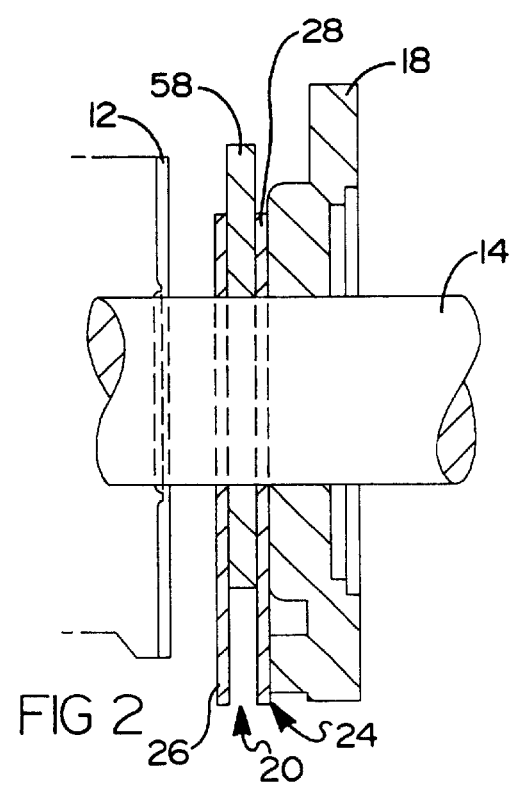
FIG. 2 is a partial cross-sectional view of a clutch brake of the present invention installed on a transmission.

Referring to FIG. 2 of the drawings, a partial cross-sectional view of the clutch brake 20 of the present invention is shown. In a preferred embodiment, clutch brake 20 includes a friction disk assembly 24 that is non-rotatably attached to transmission housing 18 for reducing rotation of transmission input shaft 14. Friction disk assembly 24 comprises two opposing friction disks 26, 28 separated by at least one, and more preferably two biasing members 30, as shown in FIG. 3, to evenly distribute a biasing force between friction disks 26, 28. However, it is recognized that any number of biasing members 30 may be employed to bias friction disks 26, 28 against each other.

In a preferred embodiment, biasing members 30 are formed of a resilient material, such as spring steel, and comprise a body portion 32 having two integrally formed lands 34. Lands 34 each include a hole (not illustrated) therethrough sized to receive a fastener, as will be described in further detail below. Alternatively, other compressible members, such as a compression spring or diaphragm spring, may be used to bias friction disks 26, 28 against each other.

Friction disks 26 and 28 preferably include a friction material 37 disposed on an inwardly facing side of each friction disk 26 and 28, as shown in FIGS. 3–5. In a preferred embodiment, friction material 37 covers only a portion of the inwardly facing side of friction disks 26 and 28. However, it is recognized that friction material 37 may cover a substantial portion of the inwardly facing side of friction disks 26 and 28. As appreciated by those skilled in the art, friction material 37 may be of any suitable material, including those friction materials used in traditional clutch brakes.

Referring to FIG. 4, an inwardly facing view of first friction disk 26 is shown in greater detail. In a preferred embodiment, first friction disk 26 is substantially "U" shaped having a vertical axis 38 and an open section 40 for disposing first friction disk 26 about transmission input shaft 14. First friction disk 26 also includes a slot 42 in communication with open section 40 for facilitating installation and removal of friction disk assembly 24 around transmission shaft 14 without partial disassembly of clutch 10 or transmission 12. First friction disk 26 further includes at least one and more preferably two integrally formed mounting brackets 44a and 44b extending therefrom that are positioned proximate a top end 46 of first friction disk 26. Mounting brackets 44a and 44b each have a hole 48 therethrough for receipt of a fastener 36, such as a rivet, to non-removably secure first friction disk 26 to biasing members 30.

Referring to FIG. 5, an inwardly facing view of second friction disk 28 is shown in greater detail. In a preferred embodiment, the "U" shaped contour, including an open section 40' and a slot 42', of second friction disk 28 is substantially similar to first friction disk 26. However, unlike first friction disk 26, mounting brackets 50a and 50b are preferably located lower on second friction disk 28 than brackets 44a and 44b on first friction disc 26. The position of brackets 50a and 50b on second friction disk 28 may vary depending on, for example, the length of biasing members 30.

In a preferred embodiment, biasing members 30 are removably secured to second friction disc 28 by a fastener 54, thereby permitting friction disc assembly 24 to remain a two-piece structure as shown in FIG. 3. Referring to FIG. 6, the two-piece friction disc assembly 24 is non-rotatably and removably secured to housing 18 by co-aligning the holes (not illustrated) in biasing member lands 34 and mounting brackets 50a and 50b with a corresponding hole (not illustrated) in housing 18 such that fastener 54 may pass through and engage housing 18. While fastener 54 is preferably a threaded bolt having a polygonal head portion 56, as illustrated in FIGS. 3 and 5, it will be appreciated that other removable fasteners may also be used to affix friction disc assembly 24 to transmission housing 18.

Referring again to FIG. 2 of the drawings, clutch brake 20 further includes a brake disc 58 that is positioned substantially between friction discs 26, 28 of friction disc assembly 24. In a preferred embodiment, brake disc 58 is a substantially smooth metal disc that is splined to rotate with transmission shaft 14 and to be axially slideable in relation thereto. However, as will be appreciated by those skilled in the art that brake disc 58 may be manufactured of any suitable material.

FIGS. 7–9 disclose a friction disk assembly according to a second embodiment of the present invention. Referring to FIG. 7, a friction disk assembly 124 is shown that includes at least one and more preferably two biasing members 130 secured to both a first friction disk 126 and a second friction disk 128 by a plurality of fasteners 136, such as a rivet. In this embodiment, first friction disk 126 is substantially similar to first friction disk 26 as described in the preferred embodiment. As shown in FIGS. 8 and 9, second friction disk 128 is substantially similar to second friction disk 28 as described in the preferred embodiment with at least one exception, namely, second friction disk 128 includes an integrally formed attachment skirt 60 disposed substantially between mounting brackets 150a and 150b. Attachment skirt 60 includes at least two grooves 62 each configured to receive fastener 54, as shown in FIG. 7, for securing friction disk assembly 124 to transmission housing 18. Securing both first friction disk 126 and second friction disk 128 to biasing members 30 advantageously permits friction disc assembly 124 to have a unitary structure further facilitating the ease with which the inventive friction disc assembly 124 is installed into clutch brake 20.

Operation of the inventive clutch brake assembly 20 will be described with reference to FIGS. 2, 3 and 6. During normal driving operation, release bearing 12 is not in contact with friction disc assembly 24 and friction discs 26, 28 are spaced apart from brake disc 58 due to the spring force of biasing member 30. When it is desired to slow the rotation of transmission input shaft 14, such as during a shifting operation, release bearing 12 contacts and compresses friction disc assembly 24 against transmission housing 18 causing friction material 37 on each of friction discs 26, 28 to contact brake disc 58. The frictional contact between friction material 37 and brake disc 58 reduces and/or stops the rotation of transmission input shaft 14. Upon return to a normal driving condition, release bearing 12 disengages friction disk assembly 24 allowing the spring force of biasing member 30 to separate friction disks 26, 28 from and permit free rotation of brake disc 58.

To facilitate removal and replacement of friction disc assembly 24, open sections 40 and 40' of friction discs 26 and 28, respectively, permit friction disc assembly 24 to easily slide over transmission input shaft 14. When worn, friction disks 26, 28 of friction disk assembly 24 can simply be moved away from shaft 14 and replaced by a new friction disk assembly 24 without removal of transmission 16. During installation, disc brake 58 easily slides between the separated friction discs 26 and 28 permitting each hole 52 in mounting brackets 50a and 50b to align with a corresponding internally threaded hole (not illustrated) in transmission housing 18. Fasteners 54 may then be easily inserted through biasing member lands 34 and mounting brackets 50a and 50b to threadably engage the corresponding holes in housing 18 to non-rotatably secure friction disk assembly 24 to housing 18. The inventive friction disk assembly 24 advantageously provides a friction disk 26, 28 on either side of brake disc 58 without requiring that an individual friction disk 26 or 28 be secured to both release bearing 12 and transmission housing 18.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A brake for slowing rotational motion of a shaft disposed between a driving device and a driven device, the driving device including a release member slidably disposed on the shaft, the brake comprising:
    a pair of opposing friction disks moveably separated by at least one resilient biasing member;
    a brake disc rotatably driven by and slidably disposed on the shaft, said brake disc positioned substantially between said opposing friction disks; and
    whereby the release member selectively contacts and compresses said friction disks against the driven device causing said friction disks to contact said brake disc to reduce rotation of the shaft.

2. The clutch brake recited in claim 1, wherein said friction disks include a friction material facing said brake disc.

3. The clutch brake recited in claim 1, wherein said friction disks each include at least one mounting bracket extending therefrom to provide a means of attachment to at least one of said biasing member and the driven device.

4. The clutch brake recited in claim 3, wherein said mounting bracket on at least one of said friction disks is non-removably secured to said biasing member.

5. The clutch brake recited in claim 3, wherein said mounting bracket on both of said friction disks is non-removably secured to said biasing member.

6. The clutch brake recited in claim 1, wherein said friction disks each include an open section for disposing said friction disks about the shaft.

7. The clutch brake recited in claim 6, wherein said friction disks each include a slot in communication with said open section for allowing removal and installation of said friction disks around the shaft.

8. The clutch brake recited in claim 7, wherein said friction disks are substantially U-shaped in configuration.

9. The clutch brake recited in claim 1, wherein said friction disks are removably secured to the driven device.

10. The clutch brake recited in claim 9, further including at least one fastener for removably securing said friction disks to the driven device.

11. The clutch brake recited in claim 10, wherein said fastener is a threaded bolt.

12. The clutch brake recited in claim 11, wherein said bolt passes through said at least one biasing member and said at least one mounting bracket on one of said friction disks and engages a correspondingly threaded hole in the driven device.

13. The clutch brake recited in claim 1, wherein said brake disc is a smooth metal disk.

14. The clutch brake recited in claim 1, wherein the resilient biasing member includes a planar body portion having a pair of integral lands.

15. A clutch brake for a vehicle including a clutch, a transmission having a transmission housing, a shaft for transmitting rotational motion from the clutch to the transmission, and a clutch release bearing slidably disposed on the shaft, said clutch brake comprising:
    a friction disk assembly having two opposing friction disks moveably connected to one another;
    a brake disc rotatably driven by and slidably disposed on the shaft, said brake disc positioned substantially between said opposing friction disks; and
    whereby the clutch release bearing selectively contacts and compresses said friction disc assembly against the transmission housing causing said friction disks to contact said brake disc to reduce rotation of the shaft.

16. The clutch brake recited in claim 15, wherein said friction disks are moveably separated by at least one resilient biasing member.

17. The clutch brake recited in claim 16, wherein the resilient biasing member includes a planar body portion having a pair of integral lands.

18. The clutch brake recited in claim 16, wherein each of said friction disks include at least one mounting bracket extending therefrom to provide a means of attachment to said biasing member.

19. The clutch brake recited in claim 18, wherein the mounting brackets on each of said friction disks are secured to said biasing member by a fastener.

20. The clutch brake recited in claim 15, wherein one of said friction disks includes an attachment skirt having at least one groove configured to receive a fastener for securing said friction disk assembly to the transmission housing.

21. The clutch brake recited in claim 15, further including at least two fasteners for removably securing said friction disk assembly to the transmission housing.

22. A clutch brake for a vehicle including a clutch, a transmission having a transmission housing, a shaft for transmitting rotational motion from the clutch to the transmission, and a clutch release bearing slidably disposed on the shaft, said clutch brake comprising:
    a friction disk assembly having two opposing friction disks moveably separated by at least one resilient biasing member, said friction disks each including a friction material facing a brake disc and at least one mounting bracket extending therefrom to provide a means of attachment to at least one of said biasing member and the transmission housing;

said brake disc rotatably driven by and slidably disposed on the shaft, said brake disc positioned substantially between said opposing friction disks; and whereby the clutch release bearing selectively contacts and compresses said friction disk assembly against the transmission housing causing said friction disks to contact said brake disc to reduce rotation of the shaft.

23. A brake for slowing rotational motion of a shaft disposed between a driving device and a driven device, the brake comprising:

a friction disk assembly that includes a pair of opposing friction disks moveably separated by at least one resilient biasing member;

a brake disc rotatably driven by and slidably disposed on the shaft, said brake disc positioned substantially between said opposing friction disks; and a release member slidably disposed on the shaft to selectively contact and compress said friction disk assembly against the driven device causing said friction disks to contact said brake disc and reduce rotation of the shaft.

24. A clutch brake assembly comprising:

a clutch;

a transmission having a transmission housing;

a shaft for transmitting rotational motion from said clutch to said transmission;

a friction disk assembly that includes a pair of opposing friction disks moveably separated by at least one resilient biasing member;

a brake disc rotatably driven by and slidably disposed on said shaft, said brake disc positioned substantially between said opposing friction disks; and a release member slidably disposed on said shaft to selectively contact and compress said friction disk assembly against said transmission housing causing said friction disks to contact said brake disc and reduce rotation of said shaft.

* * * * *